(12) United States Patent
Craigen et al.

(10) Patent No.: US 11,738,748 B2
(45) Date of Patent: Aug. 29, 2023

(54) METHOD AND APPARATUS FOR ADAPTIVE LANE KEEP ASSIST FOR ASSISTED DRIVING

(71) Applicant: GM GLOBAL TECHNOLOGY OPERATIONS LLC, Detroit, MI (US)

(72) Inventors: Tara Craigen, Nesleton (CA); Mohammadali Shahriari, Markham (CA); Jayant Sachdev, Toronto (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 358 days.

(21) Appl. No.: 17/072,068

(22) Filed: Oct. 16, 2020

(65) Prior Publication Data

US 2022/0118973 A1    Apr. 21, 2022

(51) Int. Cl.
*B60W 30/12*     (2020.01)
*G08G 1/16*      (2006.01)

(52) U.S. Cl.
CPC ............ *B60W 30/12* (2013.01); *G08G 1/167* (2013.01); *B60W 2420/42* (2013.01); *B60W 2520/06* (2013.01); *B60W 2520/10* (2013.01); *B60W 2540/18* (2013.01); *B60W 2540/229* (2020.02); *B60W 2552/05* (2020.02)

(58) Field of Classification Search
CPC ...... B60W 10/18; B60W 10/20; B60W 30/12; B60W 50/0097; B60W 50/14; B60W 2050/0024; B60W 2050/143; B60W 2420/42; B60W 2520/06; B60W 2520/10; B60W 2520/125; B60W 2520/14; B60W 2540/043; B60W 2540/18; B60W 2540/22; B60W 2540/229; B60W 2540/26; B60W 2552/05; B60W 2552/30; B62D 15/025; B62D 15/029; G06V 20/588; G08G 1/167

See application file for complete search history.

(56) References Cited

U.S. PATENT DOCUMENTS

| 2007/0225914 A1* | 9/2007 | Kawazoe | B62D 15/025 |
| | | | 340/436 |
| 2011/0187515 A1* | 8/2011 | Saito | B62D 15/0265 |
| | | | 701/1 |
| 2012/0320210 A1* | 12/2012 | Imai | B60W 30/12 |
| | | | 348/148 |
| 2013/0335213 A1* | 12/2013 | Sherony | B60W 30/12 |
| | | | 340/439 |
| 2014/0379166 A1* | 12/2014 | Kaneko | G08G 1/167 |
| | | | 701/1 |

(Continued)

*Primary Examiner* — Peter D Nolan
*Assistant Examiner* — Ce Li Li
(74) *Attorney, Agent, or Firm* — Lorenz & Kopf LLP (57) ABSTRACT

The present application generally relates to a method and apparatus for generating an action policy for controlling an autonomous vehicle. In particular, the method and apparatus are operative for detecting, by a vehicle sensor, a distance from a host vehicle to a lane edge, determining a status of a vehicle system, calculating, by a processor, a risk index in response to the status of the vehicle system, calculating, by the processor, an intervention threshold in response to the risk index, generating, by the processor, a vehicle path in response to the distance of the host vehicle to the lane edge being less than the intervention threshold, and controlling the vehicle, by a vehicle controller, in response to the vehicle path.

20 Claims, 5 Drawing Sheets

(56) References Cited

U.S. PATENT DOCUMENTS

| | | | |
|---|---|---|---|
| 2016/0001781 A1* | 1/2016 | Fung | G16H 50/20 |
| | | | 701/36 |
| 2016/0052516 A1* | 2/2016 | Kim | B60Q 9/00 |
| | | | 701/519 |
| 2021/0116256 A1* | 4/2021 | Konrardy | G01B 21/00 |

* cited by examiner

METHOD AND APPARATUS FOR ADAPTIVE LANE KEEP ASSIST FOR ASSISTED DRIVING

BACKGROUND

The present disclosure relates generally to programming autonomous motor vehicle control systems. More specifically, aspects of this disclosure relate to systems, methods and devices of path shaping for a lane keep assist algorithm to enable the algorithm to adapt to driver's preferences as well as driver state, vehicle state and environmental conditions based on a calculated risk index formula.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various automated driver-assistance systems, such as cruise control, adaptive cruise control, and parking assistance systems correspond to lower automation levels, while true "driverless" vehicles correspond to higher automation levels.

Automated driver assist systems, such as a lane keep assist systems typically determine a vehicle path in response to detection of obstacles, lane markers, roadway path and other external factors. Often these feature behaviors do not match a vehicle occupant's expectation and individual preferences. In some instances, there may be a perception of inconsistent or confusing performance based on expectations of the vehicle occupant in different driving conditions. It would be desirable to provide a methodology for vehicle path shaping during automated driver assistance operations which would meet a vehicle occupant's expectations to increase occupant comfort and reduce vehicle occupant concerns.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems to perform a lane keep assist function in response to varying risk levels and varying intervention thresholds.

In accordance with an aspect of the present disclosure, an apparatus including a sensor configured for detecting a distance of a host vehicle to a lane edge, a vehicle system configured for providing a status of a vehicle system, a processor configured to determine a risk index in response to the status of the vehicle system, to calculate an intervention threshold in response to the risk index, to generate a vehicle path in response to the distance of the host vehicle to the lane edge being less than the intervention threshold, and a vehicle controller for controlling the vehicle in response to the vehicle path.

In accordance with another aspect of the present disclosure wherein the status of a vehicle system is an engagement level of a driver as determined by a driver monitoring system.

In accordance with another aspect of the present disclosure wherein the distance between the intervention threshold and the lane edge increases proportionally to the risk index.

In accordance with another aspect of the present disclosure wherein the risk index is determined in response to at least one of a roadway surface material, a shoulder type, and a roadway geometry.

In accordance with another aspect of the present disclosure wherein the status of a vehicle system is an engagement level of a driver as determined in response to a driver steering interference In accordance with another aspect of the present disclosure wherein the processor performs a lane keep assist algorithm.

In accordance with another aspect of the present disclosure wherein the status of the vehicle system is determined in response to at least one of a vehicle speed, vehicle heading, vehicle curvature and a vehicle direction.

In accordance with another aspect of the present disclosure wherein the sensor is a camera for capturing an image and wherein the distance of the host vehicle to the lane edge is determined in response to an edge detection algorithm performed on the image.

In accordance with another aspect of the present disclosure, a method including detecting, by a vehicle sensor, a distance from a host vehicle to a lane edge, determining a status of a vehicle system, calculating, by a processor, a risk index in response to the status of the vehicle system, calculating, by the processor, an intervention threshold in response to the risk index, generating, by the processor, a vehicle path in response to the distance of the host vehicle to the lane edge being less than the intervention threshold, and controlling the vehicle, by a vehicle controller, in response to the vehicle path.

In accordance with another aspect of the present disclosure wherein the status of a vehicle system is an engagement level of a driver as determined by a driver monitoring system.

In accordance with another aspect of the present disclosure wherein the distance between the intervention threshold and the lane edge increases proportionally to the risk index.

In accordance with another aspect of the present disclosure wherein the risk index is determined in response to at least one of a roadway surface material, a shoulder type, and a roadway geometry.

In accordance with another aspect of the present disclosure wherein the status of a vehicle system is an engagement level of a driver as determined in response to a driver steering interference.

In accordance with another aspect of the present disclosure wherein the status of the vehicle system is determined in response to at least one of a vehicle speed and a vehicle direction.

In accordance with another aspect of the present disclosure wherein the vehicle sensor is a camera for capturing an image and wherein the distance of the host vehicle to the lane edge is determined in response to an edge detection algorithm performed on the image.

In accordance with another aspect of the present disclosure further including performing, by the processor, a lane keep assist algorithm.

In accordance with another aspect of the present disclosure wherein the risk index is calculated in response to a sum of a plurality of weighted risk values determined in response to a plurality of system statuses.

In accordance with another aspect of the present disclosure, an adaptive driving assistance system for performing an adaptive lane keep operation in a host vehicle including a camera for capturing an image of a roadway surface, an image processor configured for detecting a lane marker within the image, a processor for estimating a distance between the host vehicle and the lane marker, for determining an intervention threshold is response to at least one vehicle system status, and for generating a vehicle path in response to the distance between the host vehicle and the lane marker being less than the intervention threshold, and a vehicle controller for controlling the host vehicle in response to the vehicle path.

In accordance with another aspect of the present disclosure wherein the distance between the intervention threshold and the lane edge increases proportionally to the risk index.

In accordance with another aspect of the present disclosure wherein a turning radius of the vehicle path increases proportionally to the risk index.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
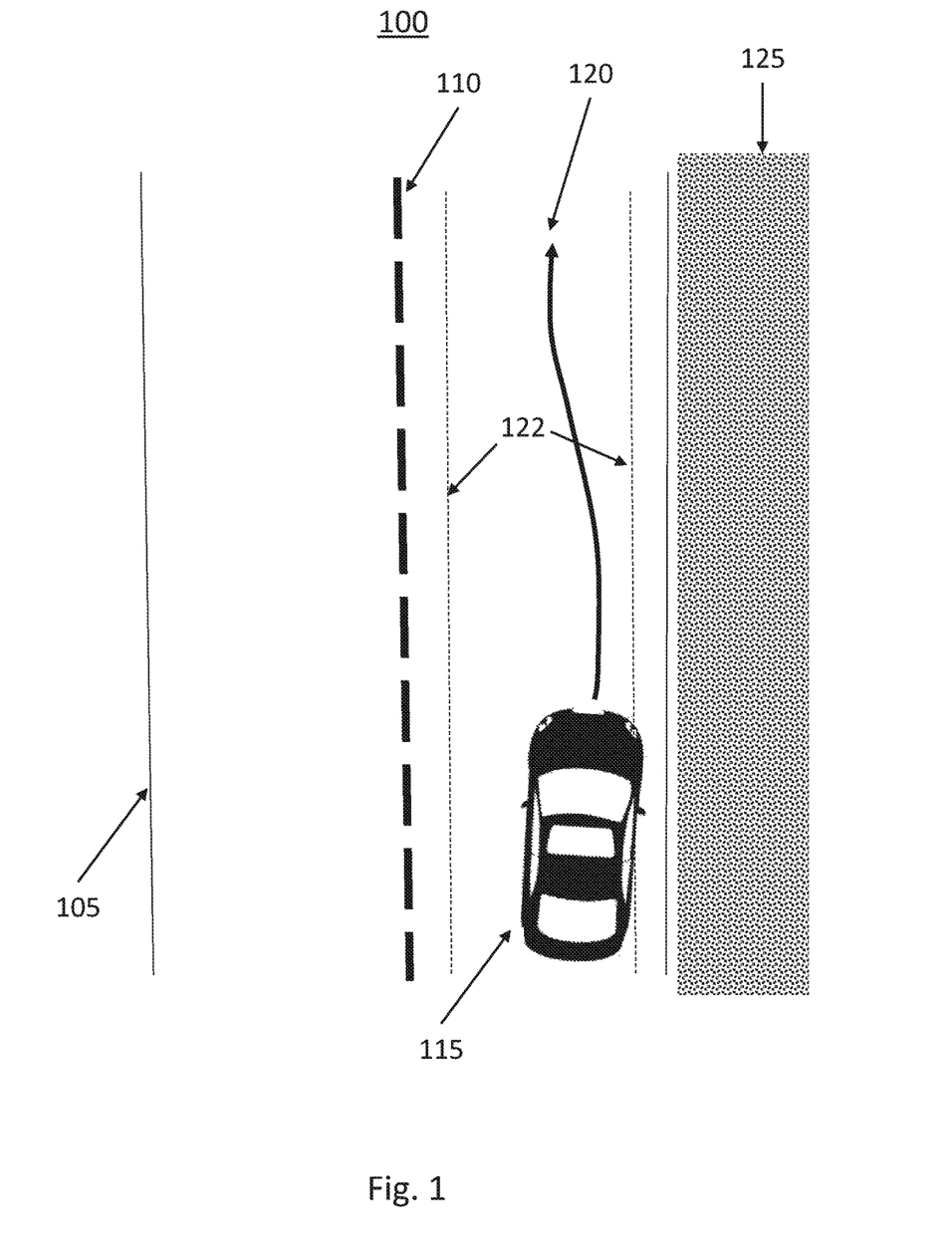
FIG. 1 shows an operating environment for adaptive lane keep assist for assisted driving in a motor vehicle according to an exemplary embodiment.

FIG. 1 schematically illustrates an operating environment 100 for use of a motor vehicle equipped with an adaptive lane keep assist system according to an exemplary embodiment. The exemplary operating environment 100 includes a two-lane roadway 105 with a center lane divider indicator 110 and a gravel shoulder 125. Also illustrated is a host vehicle 115 and the host vehicle path 120 and intervention thresholds 122. The host vehicle path 120 is determined in response to a lane keep assist (LKA) algorithm executed by an advanced driving assist system (ADAS) within the host vehicle 115. An LKA algorithm is operative to keep a vehicle within the current driving lane by monitoring lane markings and/or vehicle position, establishing intervention thresholds 122 and correcting a vehicle's path by adjusting steering angle to bring the vehicle back towards the center of the current driving lane when the vehicle approaches an intervention threshold 122. Typically, vehicle occupants feel more comfortable with ADAS systems that make smooth, gradual speed or steering adjustments. LKA algorithms typically have an intervention threshold 122 near the edge of the driving lane, so that when a vehicle reaches the intervention threshold 122, a sudden path change may be required to keep the vehicle from crossing out of the current lane. This sudden path change becomes increasing uncomfortable as the host vehicle approach path angle to the threshold increases resulting in sharper, more sudden, path changes.

The exemplary LKA algorithm is configured to execute a novel method of path shaping for LKA that enables the algorithm to adapt to driver's preferences as well as driver state, vehicle state and environmental conditions based on the calculated risk index formula. The exemplary ADAS employs a smart adaptive formulation to calculate a lane departure risk index and utilizes the risk index in automated path shaping to adaptively keep the vehicle in the lane based on driver state, driver behavior, vehicle state and environmental conditions. The automated path shaping in response to the risk index improves vehicle occupant concerns around too early or too late LKA interventions. In one exemplary embodiment, the automated path shaping may adjust the intervention thresholds 122 in response to the calculated risk index.

Figure 2:
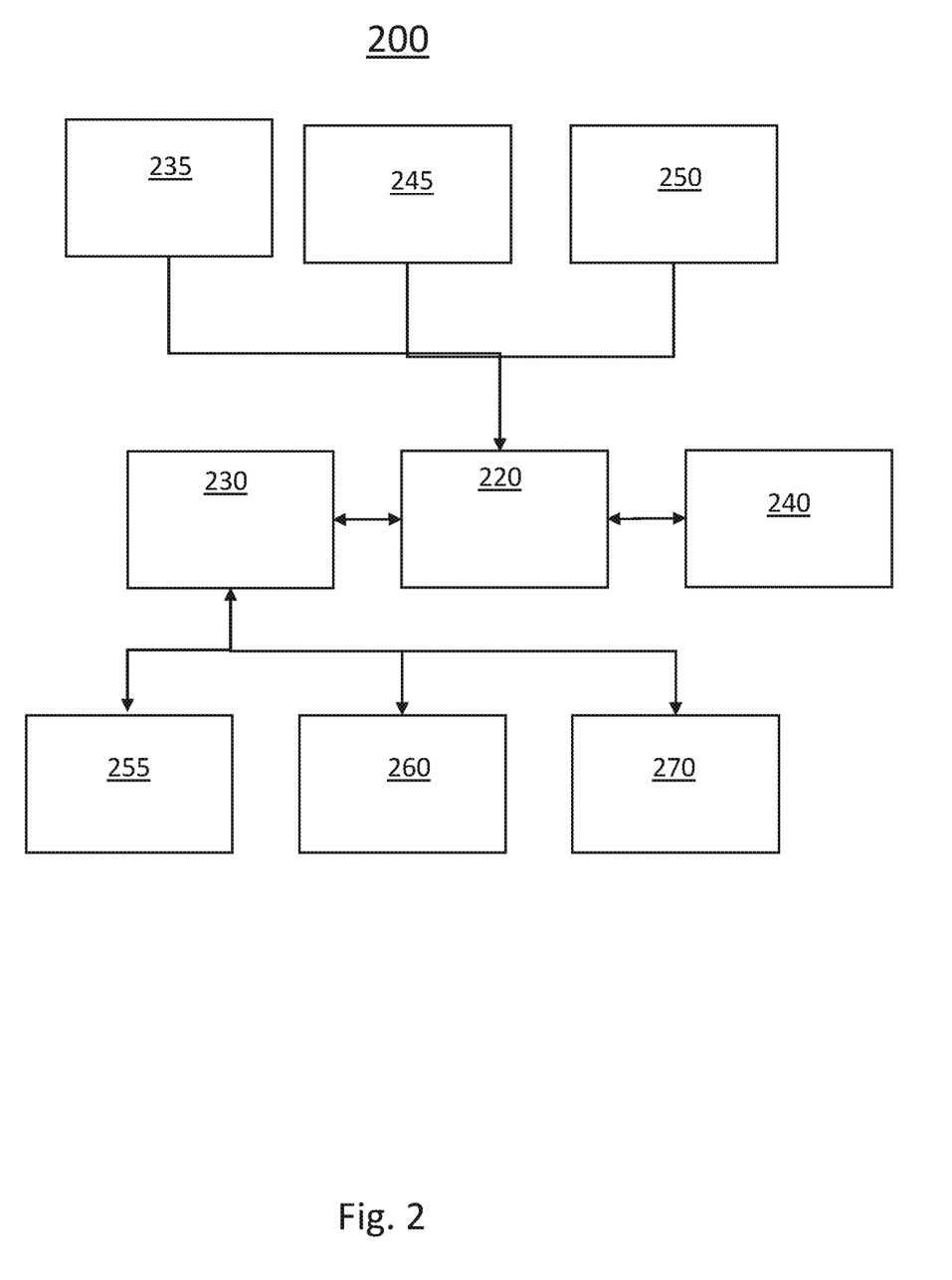
FIG. 2 shows a block diagram illustrating a system for adaptive lane keep assist for assisted driving according to an exemplary embodiment.

Turning now to FIG. 2, a block diagram illustrating an exemplary implementation of a system 200 for adaptive lane keep assist for assisted driving in a motor vehicle is shown. The exemplary system 200 is operative to generate control data to perform and adaptive lane keep operation for an ADAS equipped motor vehicle. The exemplary system 200 may include a camera 245, a memory 250 for storing map data, global positioning system (GPS) 235, an ADAS controller 220, a driver monitoring system (DMS) 240, a vehicle controller 230, a throttle controller 255, a braking controller 260 and a steering controller 270.

The exemplary system 200 may employ one or more cameras 245 as a sensor to detect the environment around the host vehicle. For example, a camera 245 may be mounted under each side view mirror of the host vehicle to capture images of the road surface on either side of the host vehicle. Using image processing techniques, such as edge detection or the like, the ADAS controller 220 or a sensor fusion controller, may determine a distance from the host vehicle to a lane indicator on each said of the vehicle. The exemplary system may further include a memory 250 for storing map data including high resolution map data, and a GPS 235 to detecting a vehicle location. The exemplary system 200 may be configured to combine the information received from the GPS 235, the camera 245 and the memory 250 to estimate a location of the vehicle.

The DMS 240 is configured to detect driver attentiveness during vehicle operation. The DMS 240 may include a vehicle cabin camera for monitoring driver eye position or infrared sensors for determining driver head position. The DMS 240 may monitor steering wheel turning and driving trajectory to judge a driver's engagement in vehicle operation. The DMS 240 may be an active DMS system which requires a driver to interact with the DMS 240 by activating certain vehicle features, responding to DMS prompts or performing other positive actions such as moving the steering wheel, responding to verbal questions, or the like. In this exemplary embodiment, the level of driver attentiveness may be a factor for calculating a risk index formula for the LKA.

The ADAS controller 220 is first operative to receive data from one or more cameras 245 as well as data from the GPS 235 and the vehicle controller 230 to estimate a distance from the host vehicle to an edge of a current running lane. The edge of the current running lane may be determined in response to a roadway lane markers, such as white or yellow lines, or in response to changes in material, such as from asphalt to gravel. The ADAS controller 220 may estimate the location of the edge of the currently running lane using image processing techniques performed on images received from one or more cameras 245.

Once the distance to the edge of the road surface has been determined for one or more lateral directions from the host vehicle, the ADAS controller 220 is then operative to determine a risk index formula for the LKA algorithm. The ADAS controller 220 may receive data from the GPS 235, camera 245, memory 250 and DMS 240 and use this data to determine the risk index formula. The risk formula index may be determined in response to risk factors such as environmental conditions, such as road geometry, distance to and type of proximate objects, and vehicle conditions, such as velocity and steering wheel angles, weather and road conditions, and shoulder type, In addition, driver input, such as steering and braking input, as well as driver preferences, past driver performance and selections may be considered.

In one exemplary embodiment, to determine the risk formula index, the ADAS processor 220 may incorporate driver monitoring systems (DMS) and hands on/off detection and adjusts intervention based on driver state and level of attentiveness. This decreases perception of inconsistent and/or confusing performance based on adjustments and communication back to the vehicle occupant with user interfaces showing standard middle or early interventions. The ADAS controller 220 may systematically adapt the LKA control signals coupled to the vehicle controller to environmental conditions and driver attentiveness in order to increase safety. The exemplary system may provide communication back to the vehicle occupants and reconfigures LKA to different types of drivers, such as a teen driver mode. The ADAS controller 220 may incorporates updated map data for detection of construction zones. Road shoulder type may be used to adjust LKA intervention to prevent the risk of vehicle catching a soft shoulder. The ADAS controller 220 may incorporates road conditions and adjust LKA intervention based on risk. The ADAS controller 220 may adjust the risk formula index based on inputs from side blind zone and risk of oncoming traffic such that the LKA may intervene sooner for left hand lane marking versus right hand side lane marking of the road. The ADAS processor 220 and the LKA algorithm may learn driver preferences and adjusts LKA interventions based on perceived risk to environmental and dynamic factors such as desired distance to neighboring vehicles or obstacles The vehicle controller 230 is configured to receive control data from the ADAS controller 220 and to control movement of the host vehicle in response to the control data. The vehicle controller 230 may generate throttle control signals to couple to the throttle controller 255 in order to control the speed of the host vehicle. The vehicle controller 230 may generate braking control signals to couple to the braking controller 260 in order to control the brake application pressure and brake application timing of the host vehicle. Likewise, the vehicle controller 230 may generate steering control signals to couple to the steering controller 270 in order to control the steering direction, and path, of the host vehicle.

Figure 3:
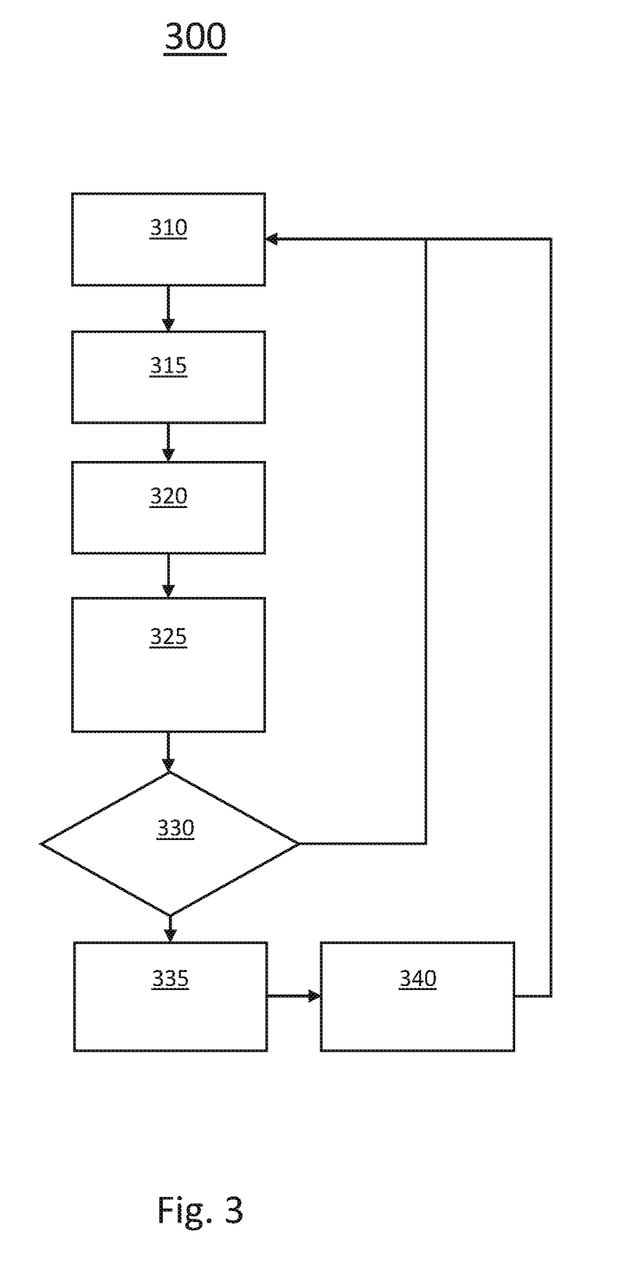
FIG. 3 shows a flow chart illustrating a method for adaptive lane keep assist for assisted driving according to another exemplary embodiment.

Turning now to FIG. 3, a flow chart illustrating an exemplary implementation of a method 300 for adaptive lane keep assist for assisted driving in a motor vehicle is shown. During engagement of an LKA algorithm, the method first determines 310 a distance to an edge of the current roadway lane. The edge may be determined for either or both of the left side roadway marker or the right-side roadway marker. Roadway markers may include solid or dashed indicator lines or changes in roadway material, such as from asphalt to gravel or the like. The distance to the roadway marker may be determined in response to an image captured by a camera mounted on a side of the host vehicle. Image processing techniques may be used, such as edge detection, to detect the roadway marker within the image and to estimate the distance to the roadway marker the distance to the roadway marker is then coupled to the ADAS processor.

The method is next operative to receive 315 data from various vehicle systems related to risk index formula factors. These factors may include driver preferences as well as driver state vehicle state and environmental conditions. For example, environmental conditions may include road edge type, shoulder type, surface friction, construction zone road barrier locations, and weather. Additional factors may include driver attentiveness as determined in response to a DMS, road geometry, proximate objects locations, lane geometry, vehicle speed, vehicle steering wheel angle, and driver input for suppression or override, such as application of the brakes or turning of the steering wheel.

The method then determines 320 a risk index for a path shaping algorithm in response to the data from the various vehicle systems. A value is assigned for each of the data received from the vehicle systems in response to a risk level associate with each of the factors. For example, if the driver is determined to be less attentive to the vehicle operation, a higher value risk factor may be determined. The risk index is then determined in response to a sum of the weighted factors where there is a weight factor ($\alpha_i$) for each of the risk values ($r_i$).

$$\text{Risk Index} = \sum_i^n \alpha_i r_i$$

The method may next be configured to determine 325 an intervention threshold in response to the risk index. The intervention threshold is a distance from the lane edge at which the LKA generates a vehicle path to bring the host vehicle back towards the center of the roadway lane. The distance of the interval threshold may be determined in response to the risk index such that the interval threshold is greater for high risks and smaller for lower risks. In an exemplary the intervention threshold may be varied in real time in response to a real time determination of the risk index. Thus, the intervention threshold may be continuously varied during the operation of the LKA.

The method then compares 330 if the distance to the edge of the lane of the host vehicle to the intervention threshold. If the distance to the lane edge is greater than the intervention threshold, the method returns to redetermine 310 the distance to the edge of the lane. If the distance to the lane edge is less than or equal to the intervention threshold, the method is then operative to generate a vehicle path for the host vehicle to be used to control the vehicle back towards the center of the roadway lane. In this exemplary embodiment, the vehicle path generated for a high-risk index may have a more rapid path back towards the lane center than a vehicle path generated for a low risk index. Alternatively, for a lower risk index, the vehicle path may prevent the vehicle from exiting the roadway lane, but not return the vehicle towards the roadway lane center if the driver is determined to be highly attentive to the host vehicle operation.

In response to the generated vehicle path, the method then controls 340 the vehicle along the generated vehicle path to return the vehicle towards the roadway lane center. The ADAS controller may generate steering control signals, throttle control signals, and/or braking control signals to control the host vehicle along the generated vehicle path. The method is then operative return to redetermine 310 the distance to the edge of the lane.

Figure 4:
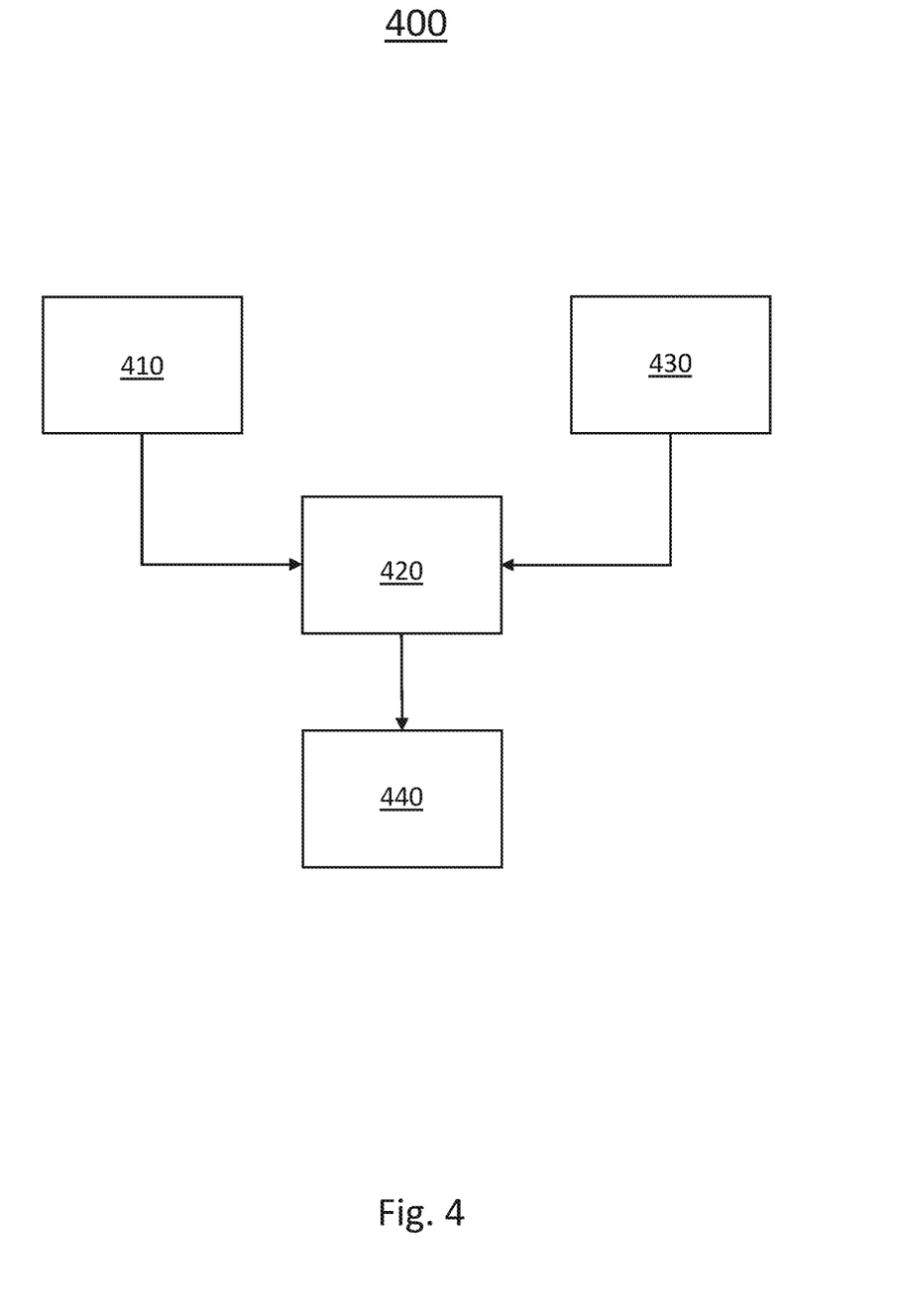
FIG. 4 shows a block diagram illustrating an exemplary implementation of a system for adaptive lane keep assist for assisted driving according to an exemplary embodiment.

Turning now to FIG. 4, a block diagram illustrating an exemplary implementation of a system 400 for adaptive lane keep assist for assisted driving in a vehicle is shown. The exemplary system 400 is implemented in a host vehicle a sensor 410, a processor 420, a vehicle system 430, and a vehicle controller 440.

In this exemplary embodiment, the sensor 410 may be configured for detecting a distance from a host vehicle to a lane edge. The sensor 410 may be a camera for capturing an image of the road surface including an image processor for performing image detection algorithms on the image, such as edge detection or the like. Alternatively, the sensor 410 may include a LiDAR, Radar, infrared transceiver or the like for determining a distance to an objection within a field of view. In one exemplary embodiment, the host vehicle may have a plurality of cameras with lateral fields of view such that the lateral distance to a lane marker or road edge may be detected on each side of the host vehicle.

The exemplary system 400 may further include a vehicle system 430 configured for providing a status of a vehicle system. The vehicle system 430 may include an inertial measurement unit for providing a status of a vehicle acceleration, a GPS for providing a status of a vehicle location, a vehicle sensor for providing a status of a vehicle speed and/or steering direction. The vehicle system 430 may be a sensor for providing a status of a roadway surface material and/or a shoulder surface material. The vehicle system 430 may be a DMS system for providing a status of an attentiveness state of a driver and or vehicle occupants, or to provide a status of a type of driver, such as teen driver. The vehicle system 430 may include a traction control system for providing a status of a vehicle traction state or for providing an estimate of a surface friction coefficient. The vehicle system 430 may include a memory for storing a map and map data and for providing a status of location construction zones, recorded road features and/or faults, and desired lane position offsets to avoid blind spots, road faults, shoulder encroachments, etc.

The processor 420 may be an ADAS processor, digital signal processor, or the like, and be configured to determine a risk index in response to the status of the vehicle system 430, to calculate an intervention threshold in response to the risk index, and to generate a vehicle path in response to the distance of the host vehicle to the lane edge being less than the intervention threshold. Initially the processor 420 is configured to perform a lane keep assist algorithm. In one exemplary embodiment, the risk index is determined in response to at least one of a roadway surface material, a shoulder type, and a roadway geometry. The distance between the intervention threshold and the lane edge may increase proportionally to the risk index. Likewise, a turning radius of the vehicle path as calculated in response to the determination of the vehicle path may decrease proportionally to the risk index.

The vehicle controller 440 may be used for controlling the vehicle in response to the vehicle path. The vehicle controller 440 may generate steering control signals, throttle control signals and braking control signals to couple to steering controllers, throttle controllers, and brake controllers to control the vehicle along the vehicle path. The vehicle controller 440 may receive data and status updates from other vehicle systems in order to confirm the host vehicle's location along the vehicle path.

In an exemplary embodiment, the system 400 may be an adaptive driving assistance system for performing an adaptive lane keep operation in a host vehicle including a sensor 410, such as a camera for capturing an image of a roadway surface and an image processor configured for detecting a lane marker within the image. The exemplary system may further include a processor 420, such as an ADAS processor, for estimating a distance between the host vehicle and the lane marker, for determining an intervention threshold is response to at least one vehicle system status, and for generating a vehicle path in response to the distance between the host vehicle and the lane marker being less than the intervention threshold. Finally, the exemplary system 500 may include a vehicle controller 440 for controlling the host vehicle in response to the vehicle path.

In one exemplary embodiment, the intervention threshold may be determined in response to a prior driver intervention. For example, the system may detect and store prior driver interventions where a driver took control of a vehicle during a prior LKA operation. This may infer a driver perceived risk to environmental and dynamic factors such as desired distance to neighboring vehicles or obstacles. The system may also include a driver feedback via a user interface, such as a dashboard LED indicator or the like, to incorporate communication back to the driver with indicating an activation of the smart adaptive intervention. The visual indicator may be configured to provide feedback to the driver of the host vehicle that the system has been activated and/or that the LKA intervention threshold has been adjusted by the system.

Figure 5:
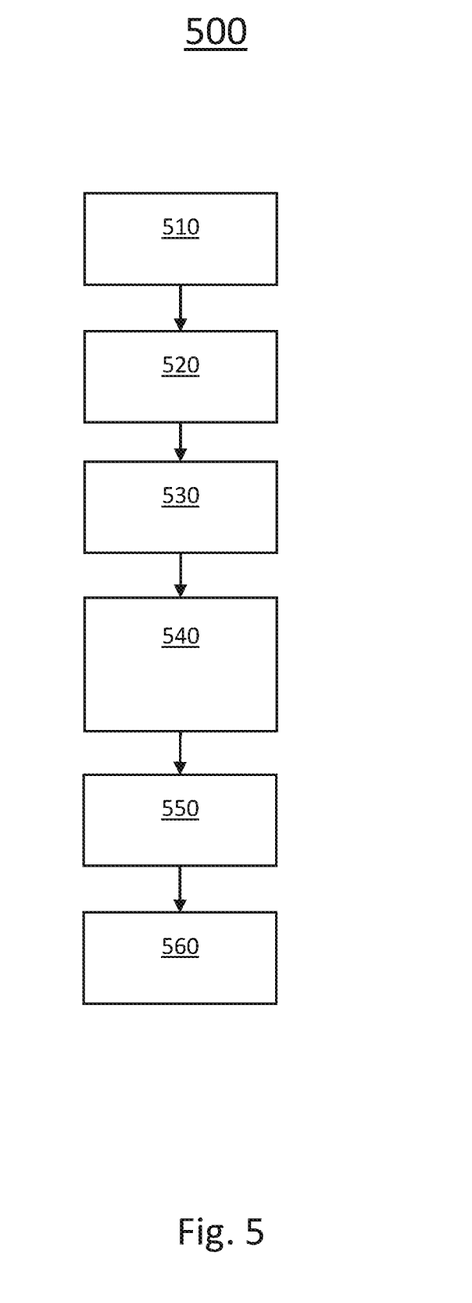
FIG. 5 shows a flow chart illustrating a method for adaptive lane keep assist for assisted driving according to another exemplary embodiment The exemplifications set out herein illustrate preferred embodiments of the invention, and such exemplifications are not to be construed as limiting the scope of the invention in any manner.

Turning now to FIG. 5, a flow chart illustrating an exemplary implementation of a method 500 for adaptive lane keep assist for assisted driving in a host vehicle is shown. The method is first operative to detecting 510 a distance from a host vehicle to a lane edge. The distance to one or more road edges may be determined in response to GPS and map data, image data, depth maps or the like. In one exemplary embodiment, the distance may be determined in response to an image captured by a camera and wherein the distance of the host vehicle to the lane edge is determined in response to an edge detection algorithm performed on the image.

The method next determines 520 a status of a vehicle system, such as a driver awareness value, or a driver engagement level, as determined by a driver monitoring system. For example, the status of the vehicle system may be determined in response to at least one of a vehicle speed and a vehicle direction.

The method is then configured for calculating 530, by a processor, a risk index in response to the status of the vehicle system. The risk index may be calculated in response to a plurality of vehicle system status and/or driver inputs or preferences. For example, the risk index may be determined in response to at a roadway surface material, a shoulder type, and/or a roadway geometry. The risk index may then be calculated in response to a sum of a plurality of weighted risk values determined in response to a plurality of system statuses.

The method then calculates 540, by the processor, an intervention threshold in response to the risk index. Generally, the distance between the intervention threshold and the lane edge may increase proportionally to the risk index. The method is next operative for generating 550, by the processor, a vehicle path in response to the distance of the host vehicle to the lane edge being less than the intervention threshold. In this example, a turning radius of the vehicle path may decrease proportionally to the risk index resulting in a more gradual, comfortable vehicle path when the risk index is low. The method then controls 560 the vehicle, by a vehicle controller, in response to the vehicle path.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An adaptive driving assistance apparatus comprising:
a sensor configured for detecting a distance of a host vehicle to a lane edge;
a vehicle system configured for providing a status of a vehicle system;
a processor configured to determine a risk index in response to the status of the vehicle system, to calculate an intervention threshold in response to the risk index, to generate a vehicle path in response to the risk index and the distance of the host vehicle to the lane edge being less than the intervention threshold such that a turning radius of the vehicle path decreases proportionally to the risk index, and wherein the status of a vehicle system is indicative of an engagement level of a driver; and
a vehicle controller for controlling the vehicle in response to the vehicle path.

2. The apparatus of claim 1 wherein the engagement level of the driver is determined by a driver monitoring system including a vehicle cabin camera for monitoring at least one of a driver eye position and a driver head position.

3. The apparatus of claim 1 wherein the distance between the intervention threshold and the lane edge increases proportionally to the risk index.

4. The apparatus of claim 1 wherein the risk index is determined in response to at least one of a roadway surface material, a shoulder type, and a roadway geometry.

5. The apparatus of claim 1 wherein the status of a vehicle system is an engagement level of a driver as determined in response to a driver steering interference.

6. The apparatus of claim 1 wherein the processor performs a lane keep assist algorithm.

7. The apparatus of claim 1 wherein the status of the vehicle system is determined in response to at least one of a vehicle speed, a vehicle heading, a vehicle curvature and a vehicle direction.

8. The apparatus of claim 1 wherein the sensor is a camera for capturing an image and wherein the distance of the host vehicle to the lane edge is determined in response to an edge detection algorithm performed on the image.

9. A method comprising:
detecting, by a vehicle sensor, a distance from a host vehicle to a lane edge;
determining a status of a vehicle system;
calculating, by a processor, a risk index in response to the status of the vehicle system, wherein the status of a vehicle system is indicative of an engagement level of a driver;
calculating, by the processor, an intervention threshold in response to the risk index;
generating, by the processor, a vehicle path in response to the risk index and the distance of the host vehicle to the lane edge being less than the intervention threshold such that a turning radius of the vehicle path decreases proportionally to the risk index; and
controlling the vehicle, by a vehicle controller, in response to the vehicle path.

10. The method of claim 9 wherein the engagement level of the driver is determined by a driver monitoring system including a vehicle cabin camera for monitoring at least one of a driver eye position and a driver head position.

11. The method of claim 9 wherein the distance between the intervention threshold and the lane edge increases through a nonlinear formulation to the risk index.

12. The method of claim 9 wherein the risk index is determined in response to at least one of a roadway surface material, a shoulder type, and a roadway geometry.

13. The method of claim 9 wherein the status of a vehicle system is an engagement level of a driver as determined in response to a driver steering interference.

14. The method of claim 9 wherein the status of the vehicle system is determined in response to at least one of a vehicle speed, a vehicle heading, a vehicle curvature and a vehicle direction.

15. The method of claim 9 wherein the vehicle sensor is a camera for capturing an image and wherein the distance of the host vehicle to the lane edge is determined in response to an edge detection algorithm performed on the image.

16. The method of claim 9 further including performing, by the processor, a lane keep assist algorithm.

17. The method of claim 9 wherein the risk index is calculated in response to a sum of a plurality of weighted risk values determined in response to a plurality of system statuses.

18. An adaptive driving assistance system for performing an adaptive lane keep operation in a host vehicle comprising:
- a camera for capturing an image of a roadway surface;
- an image processor configured for detecting a lane marker within the image;
- a processor for estimating a distance between the host vehicle and the lane marker, for determining an intervention threshold is response to at least one vehicle system status, and for generating a vehicle path in response to the risk index and the distance between the host vehicle and the lane marker being less than the intervention threshold such that a turning radius of the vehicle path decreases proportionally to the risk index, and wherein the status of a vehicle system is indicative of an engagement level of a driver determined in response to at least one of a driver's eye position and a driver's head position; and
- a vehicle controller for controlling the host vehicle in response to the vehicle path.

19. The adaptive driving assistance system for performing the adaptive lane keep operation in the host vehicle of claim 18 wherein the distance between the intervention threshold and the lane edge increases proportionally to a risk index determined in response to the at least one vehicle system status.

20. The adaptive driving assistance system for performing the adaptive lane keep operation in the host vehicle of claim 18 wherein the intervention threshold is determined in response to a prior driver intervention.

\* \* \* \* \*